United States Patent Office 3,485,797
Patented Dec. 23, 1969

3,485,797
PHENOLIC RESINS CONTAINING BENZYLIC ETHER LINKAGES AND UNSUBSTITUTED PARA POSITIONS
Janis Robins, St. Paul, Minn., assignor to Ashland Oil & Refining Company, Ashland, Ky., a corporation of Kentucky
No Drawing. Filed Mar. 14, 1966, Ser. No. 536,180
Int. Cl. C08g 5/06
U.S. Cl. 260—57
15 Claims

ABSTRACT OF THE DISCLOSURE

Novel phenolic compositions useful as coating compositions, adhesive compositions and molding compositions are prepared by a novel process in which a phenol having the general formula

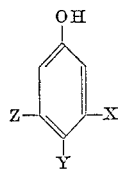

wherein X, Y and Z are hydrogen hydrocarbon radicals, oxyhydrocarbon radicals or halogen, is reacted with an aldehyde having the general formula R'CHO, wherein R' is a hydrogen or a hydrocarbon radical of 1 to 8 carbon atoms in the liquid phase under substantially anhydrous conditions at temperatures below about 130° C. in the presence of catalytic concentrations of a metal ion dissolved in the reaction medium.

DISCLOSURE

The present invention relates to novel phenol aldehyde reaction products, phenolic resins, to processes for their preparation, and to methods of preparing cross-linked or cured resins from the novel phenol aldehyde compositions.

Phenolic resins, obtained by the condensation of a phenolic compound with an aldehyde, are generally divided into two categories, the "novolac" resins and the "resole" or A-stage resins and their more highly polymerized derivatives, the "resitole" or B-stage resins. Novolac resins are permanently soluble, fusible resins in which the polymer chains have phenolic end-groups. They can be cured to insoluble, infusible products upon the addition of a source of formaldehyde, such as hexamethylenetetramine or paraform. Novolac resins have been traditionally prepared by acid catalysts employing an excess of phenol. Resole and resitole resins are prepared generally using an alkaline catalyst with excess formaldehyde and result in polymers having pendant methylol groups. In the resitole stage, the resins exhibit higher molecular weights and some cross-linking and are characterized by high viscosity. Since each methylol group constitutes a potential cross-linking site, the resitole resins are readily converted to the cross-linked, infusible polymers by heating. Conversely, these resins are highly unstable.

The novolac resins are phenolic resins in which the phenolic nuclei are joined by methylene bridges located at the ortho- and para- positions relative to the phenolic hydroxyl group. It is generally accepted that conventional acidic catalysts produce resins with a predominance of 4,4'- and 4,2'-linkages, although some 2,2'-linkages are also formed. Acid catalyzed resins have not been found fully acceptable where fast curing results are required as a result of the 4,4'- and 4,2'-linkages. Recently, novolac resins have been prepared which contain significant proportions of 2,2'-linkages using metal oxide or metal salt catalysts. This polymerization process is frequently referred to as an "ionic" polymerization. These ortho-resins cure faster and produce cross-linked phenolic resins of improved mechanical properties, theoretically, because of the more ordered structure of the polymer molecule which is obtained with 2,2'-linkages. The formation of phenolic resins of this type has, however, been limited to methods in which an excess of phenol is employed, which is necessary to prevent gelation of the resins during polymerization.

It is an object of the present invention to provide novel phenol aldehyde compositions capable of being cured at room temperature.

It is another object of the present invention to provide novel phenol aldehyde compositions which are stable in the uncured state.

It is a further object of the present invention to provide novel phenol aldehyde resins of high molecular weight and a high degree of linearity.

It is still another object of the present invention to provide a process resulting in the novel phenolic compositions.

A further object is to provide a method of producing a thermoset resin from the novel phenol aldehyde compositions of the present invention.

Other objects of the present invention will become apparent from the following detailed description and the appended claims.

The novel phenolic compositions are (1) a mixture of dimethylol compounds having the formulas:

(A)
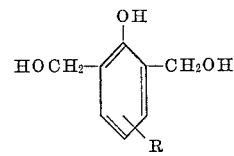

(B)
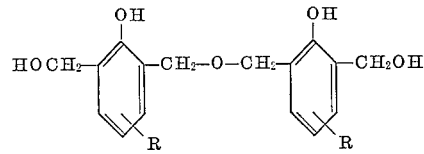

and
(C)
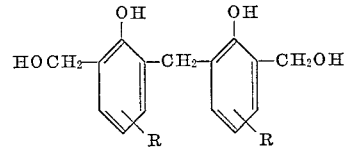

wherein R is a hydrogen or a phenolic substituent meta to the phenolic hydroxyl group, said component C being a minor constituent in the mixture; and (2) higher molecular weight condensation products of said mixture having the general formula:

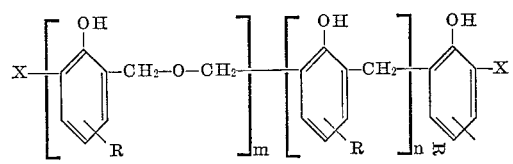

wherein R is as indicated above, the sum of $m$ and $n$ is at least two and the ratio of $m$-to-$n$ is at least one; and X is an end group from the group consisting of hydrogen and methylol, the molar ratio of said methylol-to-hydrogen end groups being at least one.

The novel phenolic compositions of the present invention as well as other highly valuable phenolic condensation products are prepared by a process which comprises reacting at temperatures below about 130° C. a phenol with an aldehyde under substantially anhydrous conditions in the liquid phase in the presence of a metal ion as the catalyst, the preferred metal ion being a divalent metal ion such as zinc, cadmium, manganese, copper, tin, magnesium, cobalt, lead, calcium, and barium.

The novel phenolic compositions of the present invention are characterized by highly unusual and valuable properties. Thus the compositions are stable at room temperature for long periods of time. Despite their stability, the novel compositions react extremely rapidly with acidic reagents, at room temperature or elevated temperatures. The high molecular weight, polymeric products of the present invention exhibit high fluidity as compared to the viscosity of prior art novolac or resitole resins. Furthermore, in the absence of acids or bases, the compositions of the present invention are color stable as compared to prior art compositions. The surprising properties of the novel compositions of the present invention are believed to be caused by the particular structure of the compositions, namely, the existence of a large number of methylol groups, the o,o'-linkages on the phenol, i.e. leaving the para-position unsubstituted, and the dimethylene ether linkages between the phenol groups. In view of the availability of the para-position for further reaction and the presence of the methylol groups, it is greatly surprising that these phenolic products do not contain substitution at the highly reactive para-position.

Although it had heretofore been possible to prepare phenolic resins of the novolac type which contained a high percentage of ortho-ortho linked para-unsubstituted phenols, the presence of some para substitution could not be avoided. The formation of these prior resins furthermore was limited to phenol-to-aldehyde ratios in excess of one and, thus, to resins containing phenolic end groups. The novel phenolic resins of the present invention, on the other hand, have at least one terminal methanol group per resin molecule and, preferably, comprise a majority of resin molecules having two terminal methanol groups. Thus, the novel phenolic resins of the present invention can be cross-linked by heating, preferably in combination with additional formaldehyde, or can be cross-linked by the addition of acidic compounds. In the cross-linking with acidic compounds, the cross-linking can occur at room temperatures at extremely rapid rates. Suitable acidic cross-linking agents include Lewis acids such as boron trifluoride, zinc chloride, and stannic chloride, as well as hydrogen-containing acids such as sulfuric acid, benzene sulfonic acid, ethyl sulfonic acid, and p-toluene sulfonic acid. In general, all acids which have heretofore been employed in the formation of phenolic resins as catalysts are suitable cross-linking agents.

The molecular weight of the phenolic resins of the present invention can be varied widely and the degree of polymerization as measured by the number of benzene rings in the polymer molecule can vary from four to forty and higher.

The phenolic resins of the present invention combine the desirable features of both resitole resins and novolac resins in possessing high molecular weight and yet high fluidity as compared to resitole resins and even the novolac resins. Contrary to resitole resins, i.e. high molecular weight fusible resins prepared at aldehyde-to-phenol mole ratios of greater than one, the resins of the present invention are stable and have long shelf lives. Contrary to novolac resins, the resins of the present invention can be cured without the addition of additional sources of formaldehyde such as hexamethylenetetramine. However, in view of the principal utility of the resin as a thermosetting resin, it is generally not necessary to employ extremely high molecular weight resins in order to achieve maximum mechanical properties in the cross-linked resin, and resins having degrees of polymerization of less than forty are generally employed, even though higher molecular weight resins can be prepared. By definition, the phenolic resins of the present invention contain more dimethylene ether linkages between the phenol rings than methylene linkages. This excess is necessary in order to achieve the superior properties of the phenolic resins of the present invention. Both the degree of polymerization and the extent of dimethylene ether linkage formation are controlled by the polymerization conditions, as will be discussed hereinafter in greater detail. It is to be pointed out, however, that phenol-formaldehyde resins having substantially only the dimethylene ether linkage can be obtained. Contrary to resitole resins heretofore available, the phenol-formaldehyde resins of the present invention can be cured rapidly at room temperature. As indicated above, the surprising properties exhibited by the phenolic resins of the present invention are believed to result from the use of phenols which have no substituent in the para-position, the existence of the benzylic ether structure in the polymer chain, and the ortho-ortho linkages of the phenol in the polymer chain.

The lower molecular weight phenol-formaldehyde reaction product is a mixture of the three compounds recited in formulas A, B, and C. It can be termed a phenol-formaldehyde adduct or a modified resole resin. Although the average molecular weight of the phenol-formaldehyde adduct is lower than that of the normal resole resin of about 350, the Adduct of the present invention finds utility as a resole resin. In that respect, the Adduct exhibits the same properties as the higher molecular weight phenolic resin discussed above. The Adduct is employed as a unitary composition without separation of its components. Although the more highly reactive components of the mixture are the dimethylol phenol and the benzylic ether, a small percentage of the third component, the methylene-bridged diphenol, is also formed. Usually, the percentage of compound (C) is less than 10% by weight of the product and, frequently, less than 1% by weight of the composition. The molar ratio of the dimethylol phenol to the benzylic ether can be varied from a high concentration of the dimethylol phenol, 99 mole percent, to a very low concentration of the dimethylol phenol, 1 mole percent. In general, those compositions which contain from 45–95% by weight of the dimethylol component are preferred. Both the dimethylol phenol and the benzylic ether are necessary constituents of the Adduct, since it is the combination of the two components which results in the formation of cross-linked phenolic resins and yet gives rise to the stability of the composition. The Adducts of the present invention are characterized by the absence of methylol groups in the para-position which, nevertheless, is unsubstituted and is thus available for subsequent reaction.

The novel compositions of the present invention have been described, principally, in terms of phenol and formaldehyde. Although these constitute the preferred starting materials, it is, nevertheless, feasible to prepare the novel compositions from meta-substituted phenols which contain substituents of the type heretofore found in phenols employed in reactions with aldehydes such as lower alkyl groups, halogens, alkoxy groups, mercapto groups, and the like. Particular examples of such phenols include 3-methylphenol, 3-propylphenol, 3-isobutylphenol, 3-methoxyphenol, 3-bromophenol, 3-ethoxyphenol, 3-chlorophenol, 3-methylthiophenol, and the like. Instead of formaldehyde, it is feasible to employ the higher aldehydes such as acetaldehyde or propionaldehyde, although no benefit, generally, is derived from such substitutions. Thus, the formation of the novel compositions from such aldehydes is more difficult and the reactivity of the resulting compositions is reduced.

The compositions of the present invention are prepared by the novel process of the present invention which, however, is not limited to the formation of the novel compositions, but can further be employed in the formation of other valuable phenol aldehyde compositions. The compositions produced by the process of the present invention are characterized by the benzylic ether structure and their ortho-ortho linkages. Thus, products of the process of the present invention comprise products in which the phenols are linked at the ortho-positions and in which a majority of the linkages between the phenols are dimethylene ether linkages. As indicated above, the reaction of the phenol with the aldehyde is carried out at temperatures below 130° C. under substantially anhydrous conditions in the presence of a metal ion as the catalyst.

The temperature is significant as a means of controlling the type of product desired. Thus, the formation of the Adduct which, as will be recognized, is a precursor to the novel phenolic resins, is achieved at temperatures up to 100° C., and preferably at temperatures of 70–95° C. Since it is necessary to remove water during the reaction, temperatures below 60° C. are generally not employed. The water of reaction, or that present in the starting materials, is azeotropically removed at temperatures below 100° C. Polymer formation occurs principally at temperatures above 100° C., preferably in the range of 110–120° C. Although the process of the present invention can be carried out at temperatures above 130° C., significant rearrangement of the resulting benzylic ether polymer to a methylene-bridged phenol aldehyde polymer occurs. At temperatures above 160° C., the rearrangement to methylene bridges is substantially complete. It will thus be apparent that the temperature can, furthermore, be employed to control the nature of the linkages between the phenol groups. Thus, at higher temperatures, the concentration of the dimethylene ether linkage will decrease and that of the methylene linkage will increase.

The process of the present invention is conducted under substantially anhydrous conditions. The term "substantially anhydrous conditions" is intended to define the use of starting materials such that the resulting reaction mixture contains no more than about 5% by weight of water and reaction conditions resulting in the continuous removal of water, i.e., at temperatures sufficient to cause water to be distilled out either as such or in the form of an azeotrope. The reason for the necessity of water removal is not clearly understood, although it has been established that the presence of water results in reaction products which cannot be cured to mechanically strong resins by the use of acidic reagents at room temperature. It is believed that the failure to continuously remove water not only affects the activity of the catalysts, but also the structure of the product formed, in permitting, for example, para-substitution.

The phenols useful in the process of the present invention are, in general, all phenols which have heretofore been employed in the formation of phenolic resins and which are not substituted at the two ortho-positions. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the benzylic ether polymers include alkyl-substituted phenols, aryl-substituted phenols, cycloalkyl-substituted phenols, alkenyl-substituted phenols, alkoxy-substituted phenols, aryloxy-substituted phenols, and halogen-substituted phenols. With the exception of the halogen-substituted phenols, the foregoing substituents contain from 1–26, and preferably from 1–6 carbon atoms. Specific examples of suitable phenols, aside from the preferred unsubstituted phenol, include: m-cresol, p-cresol, 3,5-xylenol, 3,4-xylenol, 2,3,4-trimethylphenol, 3-ethylphenol, 3,5-diethylphenol, p-butylphenol, 3,5-dibutylphenol, p-amylphenol, p-cyclohexylphenol, p-octylphenol, 3,5-dicyclohexylphenol, p-phenylphenol, p-crotylphenol, 3,5-di-methoxyphenol, 3,4,5-trimethoxyphenol, p-ethoxyphenol, p-butoxyphenol, 3-methyl-4-methoxyphenol, and p-phenoxyphenol. Such phenols can be described by the general formula

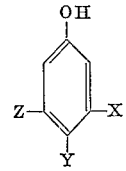

wherein X, Y, and Z are hydrogen, hydrocarbon radicals, oxyhydrocarbon radicals, or halogen.

The preferred phenols, as will be recognized from the foregoing description, are those which are unsubstituted in the para-position as well as in the ortho-positions, since the availability of the para-position for subsequent cross-linking reaction is necessary for high reactivity. The most preferred phenol is the unsubstituted phenol.

The aldehydes employed in the process of the present invention can include any of the aldehydes heretofore employed in the formation of phenolic resins and include formaldehyde acetaldehyde, propionaldehyde, furfuraldehyde, and benzaldehyde. In general, the aldehydes employed have the formula R'CHO, wherein R' is a hydrocarbon radical of 1–8 carbon atoms. The most preferred aldehyde is formaldehyde. Since the process calls for the aldehyde to be employed in substantially dry form, the preferred compound actually used is paraformaldehyde, a low molecular weight polymer of formaldehyde.

The ratio of aldehyde-to-phenol employed in the process of the present invention determines, to a significant extent, the nature of the end product obtained. Thus, in order to obtain the novel products of the present invention, the mole ratio of aldehyde-to-phenol should be at least 1 and, preferably, in the range of 1.5 to 3:1. At mole ratios below 1 and particularly at ratios below 0.9, the products obtained will not have the composition of either the Adduct or the novel phenolic resin, but are products in which the end-groups are phenolic and, thus, constitute novolac resins. Although these novolac resins do not possess the room temperature cross-linking properties of the compounds of the present invention, they are extremely fast-curing resins in their own class as a result of not only the exclusive ortho-ortho linkages, but also in view of the dimethylene ether linkages which are the prevailing linkages between the phenol groups in the polymer molecule. As indicated above, the novolac resins produced by the process of the present invention at aldehyde-to-phenol ratios below 1 can be converted to methylene-bridged novolac resins by heating to temperatures above 160° C. Preferably, however, novolac resins containing the methylene ether bridge are directly employed, since lower amounts of cross-linking agents, e.g. hexamethylenetetramine, are required to obtain a thermoset resin of optimum properties.

The process of the present invention is carried out in the liquid phase. Although it is not necessary to have an inert diluent present, it is generally preferred to conduct the reaction in the presence of one, since the reaction products of the present invention can vary from viscous liquids to solids. The use of diluents also allows a better control over the reaction. Additionally, the diluent can be employed to azeotropically remove water present in the reagents and formed during the reaction. The quantity of solvent can be varied widely and optimum concentrations of solvent will depend on the reagents, on the reaction conditions, and on the reaction products involved. In general the concentration can vary from 5% by weight of reaction mixture to dilute reaction mixtures in which the solvent constitutes 95% by weight of the reaction mixture. The solvents employed in the process of the present invention are non-polar organic solvents which are liquid at room temperature and, preferably, have boiling points below 130° C. In particular, aliphatic, cycloaliphatic, aromatic, and halogenated hydrocarbons can be employed. It is not essential that the polymer or the aldehyde monomer be completely soluble in these solvents, although such is preferable. Other suitable solvents include ethers, esters, and ketones. Examples of specific solvents include: benzene, toluene, xylene, dioxane, acetone, tetrahydrofuran, ethyl acetate, and 1,2-dichloroethylene.

The catalysts employed in the process of the present invention are metal salts. By the term "salt" is meant a compound in which the metal is ionically bonded to the salt radical. It is believed that the catalytic action of the metal salt resides in the metal ion. The salt radical contributes to the function of the metal ion in allowing such to become soluble in the organic medium in which the reaction is conducted. Hence, the salt radical is selected such that the metal salt is soluble, which is defined for the purposes of the present invention as being soluble in catalytic concentrations in the reaction mixture at reaction temperatures. Additionally, the salt radical should be that of a stronger acid in order to prevent cross-linking during the formation of the reaction product. Preferably, the anion of the salt is that of an acid having a dissociation constant of greater than $10^{-8}$. Preferred salt radicals are carboxylates of hydrocarbon acids.

The metal ion employed as the catalyst can be a monovalent, divalent, or trivalent metal ion, or even one having a higher valency state. The preferred metal ions include lead, calcium, zinc, tin, manganese, copper, and magnesium. It is to be recognized that although all of the metal ions are capable of forming the Adduct as well as the above-described phenolic resins, some are more effective in forming the lower molecular weight Adduct, some are more effective in forming the resins, while others are equally effective. Copper salts and calcium salts are preferably used at the lower temperatures giving rise to the Adduct, while stannous salts and zinc salts are more effective in the formation of the phenolic resins. Lead salts appear to be equally effective. Examples of suitable catalysts are lead neodecanoate, zinc neodecanoate, lead naphthenate, zinc naphthenate, calcium naphthenate, stannous octoate, and zinc lactate. The concentration of catalyst can vary from 0.001 to 10% by weight of the reagents and, preferably, is in the range of 0.1 to 5%. The suitability of any particular metal salt in meeting the requirement of being organic solvent-soluble need not be established by measuring the solubility of the metal salt in the actual reaction mixture, but can equally well be established by measuring the solubility of the metal salt in phenol at the contemplated reaction temperature. Some catalytic activity will be evidenced even though the solubility meets only the lower of the limits of catalyst concentration set forth hereinabove.

The process of the present invention is carried out in equipment which will provide for the continuous removal of water from the reaction mixture. It is generally preferred to continue the reaction to substantial completion, which is readily established from the decreasing amounts of water removed from the reaction mixture, in order to achieve high yields and conversion. Optimum reaction times, depending on the aldehyde, phenol, and other reaction conditions, can vary from about one minute to several hours. In general, however, faster reaction rates prevail in the organic environment of the present invention as compared to the aqueous reaction environments heretofore employed.

The products produced by the process of the present invention can be employed in applications heretofore developed for resole or novolac resins, particularly in coating compositions, in adhesive compositions, and in molding compositions. In such molding compositions, the products can be combined with large quantities of filler such as carbon black, wood flour and siliceous fillers such as sand; with mold release agents such as zinc stearate; pigments such as titanium dioxide; and curing agents such as hexamethylenetetramine. The novel compositions of the present invention are of particular value in view of their ability to cure at room temperature on addition of acidic compounds. Both the Adduct and the novel phenolic resin can be cured at room temperature to thermoset resins exhibiting superior binding properties. In this respect, they are of value as binders in the preparation of foundry core compositions, particularly when combined with minor proportions of a polyisocyanate. Other applications for the novel phenolic compositions of the present invention include their use as casting and laminating resins in which their greater fluidity, as compared to prior art phenolic resins at the same molecular weight level, is an important advantage.

The present invention is further illustrated by the following examples, in which all units of quantity are by weight unless otherwise indicated.

EXAMPLE 1

Into a glass reaction vessel equipped with an agitator, a reflux condenser, and a thermoeter, is charged 282 g. (3 moles) of phenol, 200 g. (ca. 6 moles) of paraformaldehyde, 5 g. of lead neodecanoate, and 300 ml. of benzene. The reaction mixture is heated to reflux at about 85° C. The paraform dissolves rapidly at reflux. Reflux is continued until about 35 ml. of water has been removed and no significant additional amounts of water are distilled out. The solvent is then removed by heating at 70° C. at reduced pressure (15 to 20 mm. Hg). A liquid product is obtained having a viscosity of E on the Gardner-Holt scale.

The product was analyzed by infrarad spectroscopy and nuclear magnetic resonance, after removal of unreacted phenol by steam distillation. The analysis showed the product to be a mixture of about 85% of o,o'-dimethylolphenol (A), 15% of 2,2'-dihydroxy-3,3'-dimethylolbenzylic ether (B), and a trace of 2,2'-dihydroxy-3,3'-dimethylol-diphenylmethane (C). The dimethylolphenol can be separated from the ether by treatment with water.

EXAMPLE 2

Using the equipment of Example 1, the following reaction mixture is charged to the reaction vessel:

| | |
|---|---|
| Phenol (1 mole) _____ g__ | 94 |
| Paraformaldehyde _____ g__ | 66 |
| Catalyst (see Table I) _____ g__ | 1 |
| Benzene _____ ml__ | 100 |

The reaction mixture is refluxed at about 90° C. for 60 minutes. The effectiveness of the catalysts in forming the reaction product described in Example 1 is determined by analyzing the reaction mixture for unreacted formaldehyde. The table below lists the catalyst employed in each reaction and the quantity of unreacted formaldehyde expressed as weight percent based on the original formaldehyde charged.

TABLE I

| Run | Catalyst | Percent unreacted formaldehyde |
|---|---|---|
| 1 | Lead neodecanoate | 6 |
| 2 | Zinc naphthenate | 8 |
| 3 | Ferric octoate | 11 |
| 4 | Lead naphthenate | 13 |
| 5 | Zinc neodecanoate | 14 |
| 6 | Lithium neodecanoate | 15 |
| 7 | Manganese naphthenate | 16 |
| 8 | Cobalt neodecanoate | 16 |
| 9 | Copper naphthenate | 17 |
| 10 | Calcium naphthenate | 19 |
| 11 | Manganese neodecanoate | 27 |
| 12 | Calcium neodecanoate | 28 |
| 13 | Cobalt naphthenate | 34 |

EXAMPLE 3

Into a glass reaction vessel equipped with an agitator, a refluxed condenser, and a thermometer, is charged 282 g. of phenol, 3 g. of zinc naphthenate, 3 g. of lead naphthenate, 100 ml. of benzene, and sufficient paraformaldehyde to satisfy the ratio indicated in the table below. The mixture is refluxed at about 110° C. until no further water is removed from the reaction mixture. The solvent is stripped from the reaction mixture at 70° C. at reduced pressures (15–20 mm. Hg). The resulting product is analyzed by infrared and nuclear magnetic resonance analysis, and the following results are obtained.

TABLE II

| Run | Reaction time in hours | Mole ratio of formaldehyde to phenol | Viscosity in stokes | Turbidity titration, percent H₂O* | Mole percent —CH₂OH groups | Mole percent —CH₂—O—CH₂— groups | Mole percent —CH₂— groups |
|---|---|---|---|---|---|---|---|
| 1 | 7 | 1 | 13 | 49 | 45 | 30 | 25 |
| 2 | 8 | 1.25 | 29 | 48 | 45 | 30 | 25 |
| 3 | 7 | 1.5 | 89 | 48 | 35 | 35 | 30 |
| 4 | 6 | 1.75 | 1,100 | 39 | 35 | 35 | 30 |
| 5 | 8 | 2.0 | 1,700 | 34 | 10 | 60 | 30 |

*The turbidity titrations shown in the table were conducted on 1% by weight solutions of the resin in tetrahydrofuran and illustrate the relative molecular weights of the resin obtained. Thus, water is added to the tetrahydrofuran solution until a cloud-point is obtained. A higher percentage of water indicates a lower molecular weight.

EXAMPLE 4

Into a glass reaction vessel equipped with an agitator, a reflux condenser, and a thermometer, is charged 282 g. (3 moles) of phenol, 90 g. (3 moles) of paraformaldehyde, 2 g. of zinc naphthenate, and 100 ml. of benzene. The reaction mixture is heated to reflux, about 110° C. The paraform dissolves rapidly at reflux. In the absence of the catalyst, paraform dissolves only very slowly. Reflux is continued for a period of 6 hours with azeotropic removal of water. About 39 ml. of water, corresponding to about 1.5 moles, are distilled. Further heating at about 120° C. produces very little additional water. Cooling to room temperature, a viscous polymer solution is obtained. Analysis of the reaction and the product shows the polymer to contain prevailingly dimethylene ether linkages. On heating the polymer solution to temperatures above 160° C. formaldehyde is released. The viscosity increases considerably and a partially cross-linked phenolic resin is obtained.

EXAMPLE 5

Employing the procedure of Example 4, except as indicated in the table below, the following polymerizations were carried out with the results also shown in the table.

EXAMPLE 8

The procedure of Example 7 is repeated employing instead of the para-toluene sulfonic acid, 1 part of boron trifluoride dihydrate. The same reaction occurs and a crosslinked phenolic resin is obtained. This acidic catalyst results in a higher degree of cross-linking.

EXAMPLE 9

The procedure of Example 7 is repeated using 100 parts of the Adduct of Example 1 instead of the resin of Run 1, Example 3. A cross-linked phenolic resin is obtained.

EXAMPLE 10

The procedure of Example 1 is followed, except that 3 moles of 3-methylphenol is employed. The Adduct containing the 3-methylphenol is obtained.

The foregoing examples have illustrated the formation of the novel phenolic products, the reactions of phenols and aldehydes using the process of the present invention, as well as the conversion of phenolic polymers and the Adduct to cross-linked phenolic resins and to novolac resins. The procedure set forth in the foregoing examples can be similarly employed to obtain the described products from substituted phenols and aldehydes not specifically illustrated in the examples but included within the scope of the present invention. It will be apparent that a number of changes in the process illustrated in the examples can be made without departing from the scope of the invention, since such are deemed illustrative and not comprehensive of the invention.

TABLE III

| Run | Maximum process temperature, °C. | Mole ratio CH₂O to phenol | Mole percent H₂O removed (based on CH₂O added) | Phenol resin obtained | Turbidity titration, percent H₂O in tetrahydrofuran |
|---|---|---|---|---|---|
| 1 | 118 | 1.0 | 22 | Liquid; ether-bridged | 54 |
| 2 | 170 | 1.0 | 70 | Semi-solid; methylene-bridged | 31 |
| 3 | 119 | 1.8 | 50 | Semi-solid; ether-bridged | 40 |
| 4 | 122 | 2.2 | 50 | do | 34 |

EXAMPLE 6

The phenolic resin of Run 1 in Example 3 is heated to about 160° C. for about one hour. Further polymerization occurs. A resin, solid at room temperature, is obtained. The resin is fusible and thermoplastic in nature. Infrared spectroscopy and nuclear magnetic resonance analysis shows conversion of dimethylene ether linkages to methylene linkages. The resin is useful as a novolac resin and is characterized by an extremely high degree of o,o'-linkages, and can be rapidly cured with hexamethylenetetramine.

EXAMPLE 7

To 100 parts of the resin of Run 1 in Example 3 is added 1 part of para-toluene sulfonic acid. After a short induction period, an exothermic reaction develops. A solid, infusible, cross-linked resin is formed. Infrared spectroscopy and nuclear magnetic resonance analysis shows conversion of dimethylene ether linkages and methylol groups to methylene bridges and also shows para-substitution in addition to ortho-substitution on the phenol ring.

What is claimed is:
1. A process for the preparation of phenol aldehyde reaction products which comprises reacting a phenol having the general formula

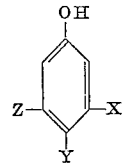

wherein X, Y, and Z are hydrogen, hydrocarbon radicals, oxyhydrocarbon radicals or halogen, with an aldehyde having the general formula R'CHO, wherein R' is hydrogen or a hydrocarbon radical of 1–8 carbon atoms at a mole ratio of aldehyde to phenol of greater than 1, in the liquid phase under substantially anhydrous conditions with the removal of water above 100° C. and at temperatures below about 130° C. in the presence of catalytic concentrations of a soluble divalent metal salt dissolved in the reaction medium.

2. The process of claim 1 wherein the reaction temperature is from about 110–120° C.

3. The process of claim 2 wherein the process is conducted in the presence of an inert organic diluent.

4. The process of claim 1 wherein X, Y, Z and R' are hydrogen.

5. The process of claim 1 wherein the metal ion is lead, calcium, zinc, tin, manganese, copper, or magnesium.

6. The process of claim 2 wherein the salt is a naphthenate or carboxylate.

7. The process of claim 5 wherein the divalent metal salt is a salt of lead or zinc.

8. The process of claim 5 wherein the salt is carboxylate, the acid of said salt radical having a dissociation constant above $1 \times 10^{-8}$.

9. The process of claim 7 wherein the salt is a carboxylate, the acid of said salt radical having a dissociation constant above $1 \times 10^{-8}$.

10. The phenol formaldehyde resin having the general formula

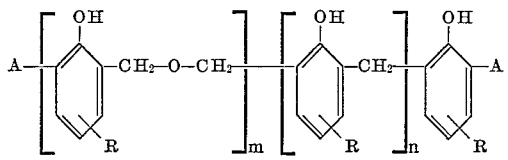

wherein R is hydrogen, hydrocarbon radical, oxyhydrocarbon radical or halogen, meta to the hydroxyl group of the phenol; $m$ and $n$ are numbers the sum of which is at least two and the ratio of $m$-to-$n$ is greater than one; and A is a hydrogen or a methylol group, the molar ratio of said methylol group to hydrogen being at least one.

11. The phenol formaldehyde resin of claim 10 wherein R is hydrogen.

12. The process of forming a thermoset resin which comprises curing the phenol formaldehyde resin of claim 10 with an acid.

13. The process of claim 12 wherein the acid is a sulfonic acid.

14. The process of claim 12 wherein the acid is boron trifluoride.

15. The thermoset resin of claim 12.

References Cited

UNITED STATES PATENTS

| | | | |
|---|---|---|---|
| 1,126,926 | 2/1915 | Wiechmann | 260—57 |
| 2,499,368 | 3/1950 | De Groote et al. | 252—331 |
| 2,501,015 | 3/1950 | Wirtel | 252—334 |
| 3,332,911 | 7/1967 | Huck | 260—57 |
| 3,409,571 | 11/1968 | Shepard et al. | 260—17.2 |
| 3,409,579 | 11/1968 | Robins | 260—30.4 |

WILLIAM H. SHORT, Primary Examiner

HOWARD SCHAIN, Assistant Examiner

U.S. Cl. X.R.

260—17.2, 38, 52, 53, 59, 613

UNITED STATES PATENT OFFICE
CERTIFICATE OF CORRECTION

Patent No. 3,485,797            Dated December 23, 1969

Inventor(s) Janis Robins

It is certified that error appears in the above-identified patent and that said Letters Patent are hereby corrected as shown below:

Column 2, line 65, that portion of the formula reading

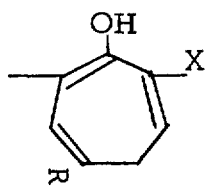   should read   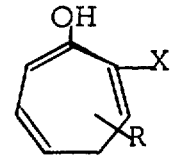

Signed and sealed this 18th day of May 1971.

(SEAL)
Attest:

EDWARD M. FLETCHER, JR.         WILLIAM E. SCHUYLER, JR.
Attesting Officer                    Commissioner of Patents